United States Patent
Moberg et al.

(10) Patent No.: US 10,599,831 B2
(45) Date of Patent: *Mar. 24, 2020

(54) INCREASED SECURITY METHOD FOR HARDWARE-TOOL-BASED AUTHENTICATION

(71) Applicant: SnowShoeFood, Inc., Madison, WI (US)

(72) Inventors: Claus Christopher Moberg, San Francisco, CA (US); Matt Luedke, Madison, WI (US); Isaac Ray, Madison, WI (US); Jami Morton, Madison, WI (US); Erland Kelley, Madison, WI (US)

(73) Assignee: SnowShoeFood Inc., Portland, OR (US)

( * ) Notice: Subject to any disclaimer, the term of this patent is extended or adjusted under 35 U.S.C. 154(b) by 364 days.

This patent is subject to a terminal disclaimer.

(21) Appl. No.: 14/617,818

(22) Filed: Feb. 9, 2015

(65) Prior Publication Data

US 2015/0227737 A1 Aug. 13, 2015

Related U.S. Application Data

(60) Provisional application No. 61/937,019, filed on Feb. 7, 2014.

(51) Int. Cl.
*G06F 21/44* (2013.01)
*G06F 21/55* (2013.01)

(52) U.S. Cl.
CPC .............. *G06F 21/44* (2013.01); *G06F 21/55* (2013.01)

(58) Field of Classification Search
CPC ...... G06F 21/44; G06F 21/55; G06F 21/6218; G06F 21/34; G06F 21/10; G06F 21/31; H04L 63/08

See application file for complete search history.

(56) References Cited

U.S. PATENT DOCUMENTS

| | | |
|---|---|---|
| 4,123,631 A | 10/1978 | Lewis |
| 5,559,665 A | 9/1996 | Taranowski et al. |
| 7,106,221 B2 | 9/2006 | Horton et al. |
| 7,403,191 B2 | 7/2008 | Sinclair |
| 7,791,506 B2 | 9/2010 | Riihimaki et al. |
| 8,206,047 B1 | 6/2012 | Isaac et al. |

(Continued)

FOREIGN PATENT DOCUMENTS

| | | |
|---|---|---|
| EP | 2535839 A1 | 12/2012 |
| GB | 2519798 A | 5/2015 |

(Continued)

*Primary Examiner* — Ali S Abyaneh
(74) *Attorney, Agent, or Firm* — Patent Technologies, LLC; Robert D. Gunderman, Jr.

(57) ABSTRACT

A method for hardware-tool-based authentication includes detecting a first set of capacitive contact points and a second set of capacitive contact points, computing, from the first set of capacitive contact points, a first set of parametric descriptors, generating a first comparison of the first set of parametric descriptors and a set of known parametric descriptors, generating a second comparison of the first set of capacitive contact points and the second set of capacitive contact points, and performing an event on the electronic device based on analysis of the first and second comparisons.

20 Claims, 2 Drawing Sheets

(56) References Cited

U.S. PATENT DOCUMENTS

| | | |
|---|---|---|
| 8,358,286 B2 | 1/2013 | Cannon |
| 8,564,538 B2 | 10/2013 | Wadsworth |
| 8,568,216 B2 | 10/2013 | Decre et al. |
| 8,648,837 B1 | 2/2014 | Tran et al. |
| 8,702,512 B2 | 4/2014 | Mineur et al. |
| 8,816,961 B2 | 8/2014 | Buil et al. |
| 8,854,306 B2 | 10/2014 | Seo et al. |
| 9,152,279 B2 * | 10/2015 | Moberg .................. G06F 3/044 |
| 2003/0235452 A1 | 12/2003 | Kraus et al. |
| 2004/0056781 A1 | 3/2004 | Rix et al. |
| 2004/0124248 A1 | 7/2004 | Selker |
| 2004/0264851 A1 | 12/2004 | Amid |
| 2006/0253707 A1 | 11/2006 | Lapstun et al. |
| 2006/0256090 A1 | 11/2006 | Huppi |
| 2007/0062852 A1 | 3/2007 | Zachut et al. |
| 2008/0177665 A1 | 7/2008 | Noordam |
| 2009/0193500 A1 | 7/2009 | Griffin et al. |
| 2009/0303001 A1 | 12/2009 | Brumer et al. |
| 2010/0277428 A1 | 11/2010 | Kumazawa |
| 2010/0321304 A1 * | 12/2010 | Rofougaran ............ G06F 3/046 345/173 |
| 2011/0095992 A1 | 4/2011 | Yeh |
| 2011/0157056 A1 | 6/2011 | Karpfinger |
| 2011/0227871 A1 * | 9/2011 | Cannon .................. A63F 13/02 345/174 |
| 2012/0007808 A1 | 1/2012 | Heatherly et al. |
| 2012/0007817 A1 | 1/2012 | Heatherly et al. |
| 2012/0120020 A1 | 5/2012 | Lee |
| 2012/0155323 A1 | 6/2012 | Ramachandran et al. |
| 2012/0194457 A1 | 8/2012 | Cannon et al. |
| 2012/0218220 A1 | 8/2012 | Tsai |
| 2012/0249295 A1 | 10/2012 | Yeung |
| 2012/0249430 A1 | 10/2012 | Oster et al. |
| 2013/0044078 A1 | 2/2013 | Hallenberg et al. |
| 2013/0069908 A1 | 3/2013 | Sung |
| 2013/0083005 A1 | 4/2013 | Arrasvuori |
| 2013/0135246 A1 | 5/2013 | Aubert et al. |
| 2013/0153944 A1 | 6/2013 | Su et al. |
| 2013/0162594 A1 | 6/2013 | Paulsen et al. |
| 2013/0194202 A1 | 8/2013 | Moberg et al. |
| 2013/0232563 A1 | 9/2013 | Ache et al. |
| 2013/0314360 A1 * | 11/2013 | Saitoh .................. G06F 3/0412 345/173 |
| 2013/0339850 A1 | 12/2013 | Hardi et al. |
| 2014/0046855 A1 | 2/2014 | Moberg |
| 2014/0073300 A1 | 3/2014 | Leeder et al. |
| 2014/0123249 A1 | 5/2014 | Davis et al. |
| 2014/0304806 A1 * | 10/2014 | Koo ....................... G06K 7/081 726/16 |

FOREIGN PATENT DOCUMENTS

| | | |
|---|---|---|
| WO | 2006098690 A1 | 9/2006 |
| WO | 2011126515 A1 | 10/2011 |
| WO | 2011154524 A | 12/2011 |
| WO | 20120136817 A1 | 10/2012 |
| WO | 2015076605 A1 | 5/2015 |

\* cited by examiner

```
┌─────────────────────────────────────────────────────┐
│   Detecting 1st and 2nd Sets of Contact Points S110 │
└─────────────────────────────────────────────────────┘

┌─────────────────────────────────────────────────────┐
│   Computing 1st Set of Parametric Descriptors S120  │
└─────────────────────────────────────────────────────┘

┌─────────────────────────────────────────────────────┐
│   Computing 2nd Set of Parametric Descriptors S121  │
└─────────────────────────────────────────────────────┘

┌─────────────────────────────────────────────────────┐
│   Comparing 1st Set of Parametric Descriptors to    │
│   Known Sets of Parametric Descriptors S130         │
└─────────────────────────────────────────────────────┘

┌─────────────────────────────────────────────────────┐
│   Comparing 2nd Set of Parametric Descriptors to    │
│   Known Sets of Parametric Descriptors S131         │
└─────────────────────────────────────────────────────┘

┌─────────────────────────────────────────────────────┐
│   Comparing 1st and 2nd sets of Points S140         │
└─────────────────────────────────────────────────────┘

┌─────────────────────────────────────────────────────┐
│   Performing an Event on Electronic Device S150     │
└─────────────────────────────────────────────────────┘
```

FIGURE 1

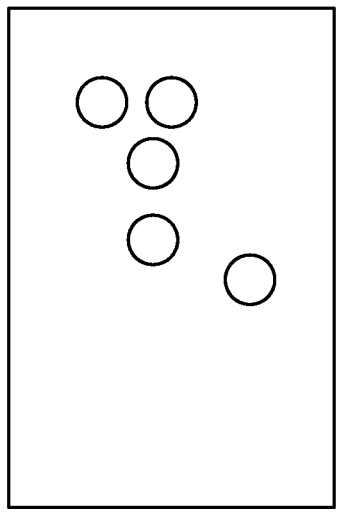 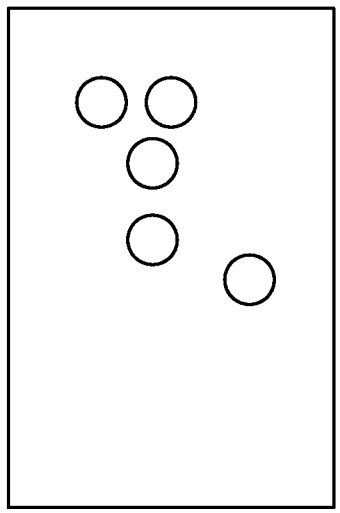 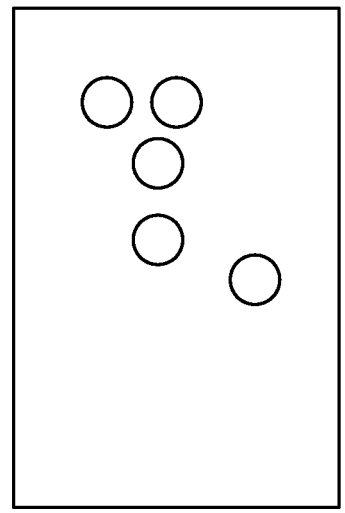
1st set of points     2nd set of points     3rd set of points
FIGURE 2A
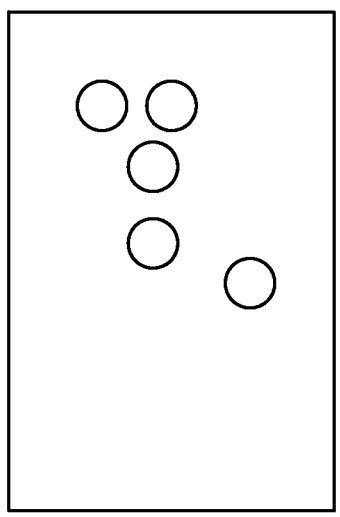 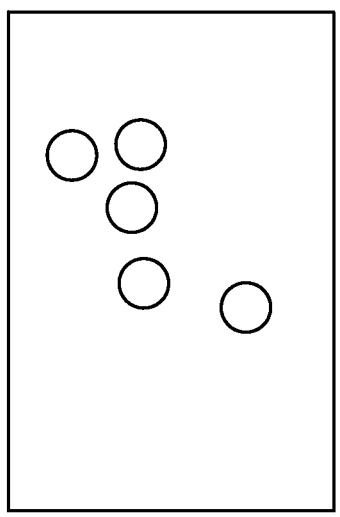 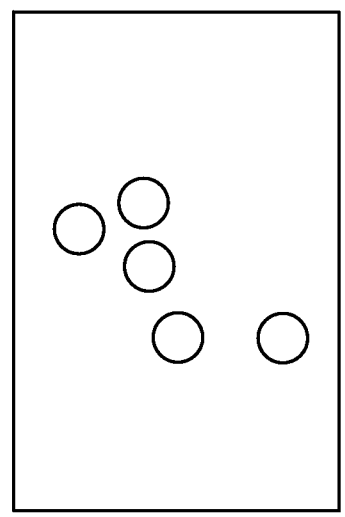
1st set of points     2nd set of points     3rd set of points
FIGURE 2B

INCREASED SECURITY METHOD FOR HARDWARE-TOOL-BASED AUTHENTICATION

CROSS-REFERENCE TO RELATED APPLICATIONS

This application claims the benefit of U.S. Provisional Application Ser. No. 61/937,019, filed on 7 Feb. 2014, which is incorporated in its entirety by this reference.

TECHNICAL FIELD

This invention relates generally to the consumer electronics field, and more specifically to an increased security method for hardware-tool-based authentication in the consumer electronics field.

BACKGROUND

As more and more important transactions and events are conducted electronically, the need to authenticate these transactions and events also grows in importance. While software authentication (such as entering a password) allows for identification, security concerns with software authentication have encouraged the growth of hardware authentication. The use of a capacitively interacting hardware tool offers an inexpensive and convenient form of hardware authentication for electronic devices with capacitive touch interfaces. However, on many electronic devices, the code required to perform hardware authentication is exposed, leaving the device vulnerable to potential security breaches. Thus, there is a need in the consumer electronics field to create an increased security method for hardware-tool-based authentication. This invention provides such new and useful method.

BRIEF DESCRIPTION OF THE FIGURES

FIG. 1 is a chart representation of a method of a preferred embodiment;

FIG. 2A is an example representation of a set of capacitive touch point samples; and FIG. 2B is an example representation of a set of capacitive touch point samples.

DESCRIPTION OF THE PREFERRED EMBODIMENTS

The following description of the preferred embodiments of the invention is not intended to limit the invention to these preferred embodiments, but rather to enable any person skilled in the art to make and use this invention.

As shown in FIG. 1, an increased security method 100 for hardware-tool-based authentication on an electronic device having a capacitive touch sensor includes detecting, on the capacitive touch sensor, a first set and a second set of points of capacitive contact from a hardware tool S110; computing, from the first set of points, a first set of parametric descriptors S120; generating a first comparison of the first set of parametric descriptors and a set of known parametric descriptors S130; generating a second comparison of the first and second sets of points S140; and performing an event on the electronic device based on analysis of the first and second comparisons S150. The method 100 may additionally or alternatively include computing, from the second set of points, a second set of parametric descriptors S121 and/or generating a third comparison of the second set of parametric descriptors and a set of known parametric descriptors S131.

The method 100 is preferably implemented using the hardware tools described in U.S. patent application Ser. No. 13/385,049 and in U.S. patent application Ser. No. 13/961,387, which are incorporated in their entirety by this reference, but may alternatively be implemented using any suitable hardware tool.

The electronic device of the method 100 is preferably a smartphone or tablet, but may additionally or alternatively be any suitable electronic device with a capacitive sensor capable of interfacing with a physical object and transmitting hardware authentication data. Some other examples of electronic devices include laptops, media players, cameras, measurement devices, gaming systems, vehicular computing devices, set-top boxes, and televisions.

The method 100 preferably functions to enable authentication on an electronic device with a capacitive touch sensor via a hardware tool. For example, the method 100 could be used to allow the hardware tool, when placed near the capacitive touch sensor, to authenticate a user, allowing access to the device. Authenticating a user's identity for information access is one example of a event that can be performed by the method 100; additional examples include authenticating a user's identity for transactions (for instance, transferring money, information, or digital goods from one party to another where the hardware tool corresponds to one party), authenticating location (e.g. providing evidence that a transaction occurred at a specific place using a hardware tool corresponding to that place), and authenticating digital goods (e.g. allowing access or transfer of digital goods to a party possessing a hardware tool corresponding to those goods). Further examples of authentications that could be performed using the method 100 are found in U.S. patent application Ser. No. 13/385,049. As additional examples of events that could be performed by the method 100, pressing the hardware tool to the capacitive touch sensor may both initiate a transfer of money and authenticate the sending party. As another example, pressing the hardware tool to the capacitive touch sensor may enable an action in a game, for instance, firing a virtual weapon.

The method 100 may allow the management and transfer of data based on physical objects serving as authenticators. Using physical objects as authenticators may provide a number of advantages, including increasing authentication security, simplifying ownership transfers, and enhancing user experiences. Linking data to physical objects may also provide advantages for the physical objects; even static objects may, through their link to data, offer a dynamic experience. Further, the interaction between the physical object and the electronic device of the method 100 may provide further advantages; for example, if the electronic device is a geolocation-enabled smartphone, the transfer of data might be linked to a particular location as well as a particular physical object.

The method 100 may in particular provide advantages to the entertainment industry. Using the method 100, owners of a physical object (e.g. a figurine, a toy) may, through electronic devices, access dynamic content specific to that object. Physical object manufacturers can control how the dynamic content links to an individual object owner in a number of ways. For instance, a sports figurine maker may create a series of Andrew Luck (an NFL quarterback) bobbleheads with unique authentication characteristics (i.e., each bobblehead is distinguishable from the others by the authentication process). Then, dynamic content can be tailored for each individual bobblehead. The sports figurine maker may also choose to make the bobbleheads with identical authentication characteristics or semi-identical authentication characteristics (e.g., batches sold in different countries have different authentication characteristics). In this case, the dynamic content may simply be linked to the bobblehead type and not to the individual owner. Alternatively, the manufacturer may use a combination of bobblehead type and other information (e.g. a user account) to tailor dynamic content to users.

The method 100 also functions to guard against security breaches. By detecting multiple sets of points at different times, the method 100 collects data on the movement of the hardware tool. This data can then be analyzed to determine if the detected points represent interaction by an authorized user or unauthorized interaction. For example, if all of the multiple sets of points detected are exactly the same as shown in FIG. 2A (something that would be extremely unlikely to happen with a real-life hardware tool interaction), the data might indicate that an unauthorized user had acquired a set of points of contact (potentially through a man-in-the-middle attack) and attempted to inject those points in software to achieve access without possession and/or proper use of the hardware tool. In contrast, if there is some movement of the sets of points as shown in in FIG. 2B, that may indicate that a real use of the hardware tool.

Detecting, on the capacitive touch sensor, a first set and a second set of points of capacitive contact from a hardware tool S110 functions to allow the capacitive touch sensor to detect the hardware tool and its movement over time. The capacitive touch sensor preferably interprets the hardware tool as a series of human touches; alternatively, the touch sensor may interpret the hardware tool as a more general profile of capacitance changes across the sensor or in any other suitable manner. The first and second sets of points are preferably detected at different times. From the first set of points, second set of points, and the elapsed time between their detection, a description of movement can be formed. This concept can be expanded to many sets of points detected over a period of time (i.e., a sequence of sets of points). As the number of samples (sets of captured points) per unit time increases, so does movement resolution.

Points of capacitive contact are preferably points at which a capacitive touch sensor records a touch event (e.g., a change in capacitance). The capacitive touch sensor is preferably a projected capacitive touch (PCT) sensor utilizing mutual capacitive sensors (used in multi-touch capacitive sensors) but may alternatively be a PCT sensor utilizing self-capacitance sensors, with surface capacitance sensing technology, or with any other suitable capacitive sensing technology. The points of capacitive contact are preferably detected as human touch, but may alternatively be detected as distinct from human touch. For example, some capacitive sensors are able to distinguish between touch events by a finger and touch events by a stylus; the capacitive contact points may be detected as touch events by either the finger or the stylus.

In the case of PCT sensing technology utilizing mutual capacitive sensors, human touch is generally sensed by a drop in capacitance at the sensors; this drop in capacitance is caused by the flow of current away from the sensors (the human finger represents a conductive path to ground through which current may flow). Generally, the drop in capacitance must occur over a large enough area (i.e. over enough individual sensors) to be detected as a human touch. Each capacitive contact point preferably corresponds to detection of the touch of a single human finger (e.g., the sensor detects the proximity of the hardware tool as a set of simultaneous human touches); alternatively, there may be correspondence between any number of capacitive contact points and any number of finger touches (or stylus interactions, etc.) or no correspondence at all.

Computing, from the first set of points, a first set of parametric descriptors S120 functions to generate a description of the detected points from the data taken by the electronic device. For example, if the data is just a set of coordinates, the parametric description is preferably a description of the positioning of the coordinates relative to a reference coordinate. The parametric description is preferably invariant of positioning of the hardware tool on the capacitive touch sensor (e.g. if the hardware tool contacts in the upper left corner of the device it should have the same parametric description as if it contacts the lower right corner of the device) but may alternatively be variant based on positioning. If the data includes more than touch coordinates, the parametric data preferably includes this additional data, but alternatively may not. One example of parametric descriptors involves a two-dimensional coordinate system where coordinate [0,0] is set to the midpoint of the line connecting the two points of contact spaced farthest from each other, and the line is the x-axis. The parametric descriptors in this example would be the coordinates of each touch detected in this new coordinate system. If, for instance, touch pressure were also detected, that could be included as an additional parameter for each touch. Other examples of parametric descriptions might include geometry formed by the points or magnitudes/distances from some reference point.

Computing, from the second set of points, a second set of parametric descriptors S121 is preferably substantially similar to Step S120. The method 100 may include Step S121 for a number of reasons; for example, Step S121 may be used to generate a set of parametric descriptors so that the set of parametric descriptors corresponding to the second set of capacitive contact points may be compared to the set of parametric descriptors corresponding to the first set of capacitive contact points (as opposed to a direct comparison of the sets of points). This may be useful even if it does not directly capture movement (e.g., because the parametric descriptors are position and rotation invariant); it may capture noise in the capacitive touch sensor. This noise may be used to verify that the touch events are genuine (e.g., the lack of distortion of or noise differences may be indicative of a non-genuine touch event).

Generating a first comparison of the first set of parametric descriptors and a set of known parametric descriptors S130 functions to compare the first set of points of contact (as described by its parametric descriptors) to one or more or known sets of points or parametric descriptors to determine whether the first set of parametric descriptors matches a known set. The first set of parametric descriptors is preferably compared to a database of known sets of parametric descriptors linked to access or authentication levels. Alternatively, the first set of parametric descriptors may be analyzed by an algorithm, where certain algorithm outputs are linked to access or authentication levels. The database or algorithm is preferably stored on the electronic device, but may alternatively be stored in a remote server, in the cloud, or in any other suitable location. If there is a high match between the first set of parametric descriptors and a set of known parametric descriptors, a flag is preferably set in software (either on the electronic device or in an alternative location) that indicates a matching step in authorization is complete. If there is not a high match between the first set of parametric descriptors and a set of known parametric descriptors, a flag is preferably set in software that the matching step of authorization failed. If the matching step of authorization fails, the electronic device preferably attempts to capture another set of points and compare the parametric descriptors of that set to the set of known parametric descriptors. Depending on the level of mismatch between the parametric descriptors of a set and the sets of known parametric descriptors, and depending on the number of failed authorizations, the electronic device may deny further access to its interface.

Generating a third comparison of the second set of parametric descriptors and a set of known parametric descriptors S131 is preferably substantially similar to Step S130. The method 100 may include Step S131 for a number of reasons; for example, Step S131 may be used to detect the changing capacitive effects of a dynamic hardware tool (i.e., a hardware tool that alters its capacitive profile over time) or changing capacitive effects due to environmental effects.

Generating a second comparison of the first and second sets of points S140 functions to detect the change in detected points of capacitive contact. This change is linked to a movement during the elapsed time between the detection of the first set of points and the second set of points. This comparison preferably occurs over many sets of points detected over time in order to capture an accurate description of the motion of the hardware tool (and potentially its changing capacitive interaction with the electronic device, if the hardware tool can change its capacitive effect on the device). Alternatively, the comparison may occur across only two sets (the first and second set of points). The raw coordinates of the first and second sets of points are preferably the data compared; alternatively, the first and second sets of points may be compared indirectly by comparing processed data describing them (e.g. parametric descriptors). A description of motion is preferably generated by an analysis of the comparison (or multiple comparisons), including the displacements of detected point sets and the elapsed time over which each displacement occurred. This analysis preferably takes into account possible changes in capacitive effect of the hardware tool; for example, if only one point moved and the others did not, this might mean the hardware tool has reconfigured its capacitive effect (e.g., a dynamic hardware tool) or it might mean a user lifted away one corner of the tool from the capacitive touch screen. If it is detected that a user used the hardware tool improperly, the electronic device may prompt the user to attempt to use the tool again. The user may also be asked to perform a specific motion (e.g., rotating the tool counterclockwise). After the description of motion is generated, the description of motion is preferably analyzed to see if it is consistent with normal use of the hardware tool or with potentially unauthorized use. As a simple example, this might mean making sure the hardware tool moves between samples; it is very unlikely that the tool will not move at all, so the detection of an unmoving tool might indicate potentially unauthorized use (e.g. a software man-in-the-middle attack).

As a second example, the samples (e.g., sets of points sampled) may be compared to see if they exhibit distortions or changes due to touch sensor noise. In some cases, even if certain distortions are detected, they may be compared to a touch sensor noise profile corresponding to a particular touch sensor model. This may be useful, for example, if an unauthorized user attempts to transmit copied touch events from a phone with a different touch sensor model than the one that the touch events originated on; the noise characteristics detected from the events would not match noise characteristics of the transmitting phone.

As another example, the description of motion may be processed by an algorithm that determines if the motion describes typical motion by a human user. More specifically, the description of motion may be processed by an algorithm that determines if the motion describes typical motion by an authorized user. In this example, the typical motion of authorized users is preferably captured either by a calibration step or through normal use of the hardware tool by those authorized users. If the analysis results in a high likelihood that hardware tool use is by an authorized user, a flag is preferably set in software (either on the electronic device or in an alternative location) that indicates an authorized user step in authorization is complete. If the analysis does not result in a high likelihood that hardware tool use is by an authorized user, a flag is preferably set in software that the authorized user step of authorization failed. If the authorized user step of authorization fails, the electronic device preferably prompts the user to re-attempt using the hardware tool. Depending on the likelihood of hardware tool use by an authorized user, and depending on the number of failed authorizations, the electronic device may deny further access to its interface. Step S140 preferably occurs only after a match has been established by S130, but alternatively may occur at any time.

Performing an event on the electronic device based on analysis of the first and second comparisons S150 functions to allow an event to be performed when the first set of parametric descriptors matches a set of known parametric descriptors and there is a high likelihood that the hardware tool was used by an authorized user. This event preferably occurs whenever both the matching and authorized user steps of authorization are complete, but may alternatively occur at any other time. This event could be authenticating a transaction, unlocking the device to allow access, or any other event on the electronic device. This event could also include locking the electronic device or wiping its data (in the case of multiple failed comparisons). This event may be performed by the native operating system of the electronic device or by an application running on top of the operating system, or in any other suitable manner.

Analysis of the first comparison preferably includes verifying that the first set of parametric descriptors match a set of known parametric descriptors (e.g., identifying the hardware tool). Analysis of the second comparison preferably includes one or more of the analyses discussed in the section describing Step S140, but may additionally or alternatively include any suitable type of analysis.

The methods of the preferred embodiment and variations thereof can be embodied and/or implemented at least in part as a machine configured to receive a computer-readable medium storing computer-readable instructions. The instructions are preferably executed by computer-executable components preferably integrated with a computer system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for hardware-tool-based authentication comprising:
   detecting, on a capacitive touch sensor of an electronic device, a first set capacitive contact points and a second set of capacitive contact points; wherein the first set of capacitive contact points and the second set of capacitive contact points are detected due to proximity of a hardware tool to the capacitive touch sensor;
   the hardware tool comprising a predetermined number of capacitively interactive contact pads arranged in a spatial pattern on a conductive substrate wherein the conductive substrate is configured as a current coupler, the capacitively interactive contact pads each having intrinsic capacitance and having contact surfaces lying in a plane so as to contact the capacitive touch sensor simultaneously and so create the first set of capacitive contact points and the second set of capacitive contact points;
   computing, from the first set of capacitive contact points, a first set of parametric descriptors;
   wherein each capacitively interactive contact pad creates a capacitive contact point that is unique to that capacitively interactive contact pad;
   generating a first comparison of the first set of parametric descriptors and a set of known parametric descriptors;
   generating a second comparison of the first set of capacitive contact points and the second set of capacitive contact points; and
   performing an event on the electronic device based on analysis of the first and second comparisons.

2. The method of claim 1, wherein detecting comprises detecting capacitive contact points by detecting changes in capacitance on a projected capacitive touch sensor.

3. The method of claim 2, wherein detecting comprises interpreting the changes in capacitance as human touch events.

4. The method of claim 2, wherein detecting comprises interpreting the changes in capacitance as stylus touch events.

5. The method of claim 1, wherein generating the second comparison of the first set of capacitive contact points and the second set of capacitive contact points comprises comparing raw capacitive contact data.

6. The method of claim 1, further comprising computing, from the second set of points, a second set of parametric descriptors; wherein generating the second comparison of the first set of capacitive contact points and the second set of capacitive contact points comprises comparing the first set of parametric descriptors and the second set of parametric descriptors.

7. The method of claim 6, wherein generating the second comparison of the first set of capacitive contact points and the second set of capacitive contact points further comprises measuring touch sensor noise characteristics.

8. The method of claim 7, wherein performing an event on the electronic device based on analysis of the first and second comparisons comprises performing the event based on comparison of the touch sensor noise characteristics to a known touch sensor noise profile.

9. The method of claim 6, further comprising generating a third comparison of the second set of parametric descriptors and a set of known parametric descriptors.

10. The method of claim 9, wherein perfeorming an event further comprises performing the event based on analysis of the first, second, and third comparisons.

11. The method of claim 1, wherein performing an event comprises prompting a user to reattempt placing the hardware tool within proximity of the capacitive touch sensor.

12. The method of claim 11, wherein performing the event further comprises prompting the user to rotate the hardware tool while in proximity of the capacitive touch sensor.

13. The method of claim 1, wherein generating the second comparison of the first set of capacitive contact points and the second set of capacitive contact points comprises determining that the second set of capacitive contact points is displaced from the first set of capacitive contact points.

14. The method of claim 13, wherein performing an event on the electronic device based on analysis of the first and second comparisons comprises authenticating a user.

15. The method of claim 1, wherein generating the second comparison of the first set of capacitive contact points and the second set of capacitive contact points comprises determining that the second set of capacitive contact points is not displaced from the first set of capacitive contact points.

16. The method of claim 15, wherein performing an event on the electronic device based on analysis of the first and second comparisons comprises denying a user access to the electronic device.

17. The method of claim 1, wherein generating the second comparison of the first set of capacitive contact points and the second set of capacitive contact points comprises determining that motion of the hardware tool resembles human motion by using a motion analysis algorithm.

18. The method of claim 17, wherein performing an event on the electronic device based on analysis of the first and second comparisons comprises authenticating a user.

19. The method of claim 1, wherein generating the second comparison of the first set of capacitive contact points and the second set of capacitive contact points comprises determining that motion of the hardware tool does not resemble human motion by using a motion analysis algorithm.

20. The method of claim 19, wherein performing an event on the electronic device based on analysis of the first and second comparisons comprises denying a user access to the electronic device.

* * * * *